Patented Sept. 30, 1924.

1,509,864

UNITED STATES PATENT OFFICE.

GUSTAVUS J. ESSELEN, JR., OF SWAMPSCOTT, MASSACHUSETTS, ASSIGNOR TO ARTHUR D. LITTLE, INC., OF CAMBRIDGE, MASSACHUSETTS, A CORPORATION OF MASSACHUSETTS.

METHOD FOR PRODUCING A MIXTURE OF MONO- AND DI-ACETINS.

No Drawing.    Application filed July 21, 1920.   Serial No. 397,960.

*To all whom it may concern:*

Be it known that I, GUSTAVUS J. ESSELEN, Jr., a citizen of the United States, residing at Swampscott, in the county of Essex and State of Massachusetts, have invented certain new and useful Improvements in Methods for Producing a Mixture of Mono- and Di-Acetins; and I do hereby declare the following to be a full, clear, and exact description of the invention, such as will enable others skilled in the art to which it appertains to make and use the same.

The present invention relates to a new method for producing a mixture of mono- and diacetins.

For various reasons, which will be obvious to those skilled in the art, it is desirable to provide a non-alcoholic solvent for certain oils such as are used for example in flavoring extracts which can replace the alcoholic solvents now widely used. It has been discovered that a mixture of mono- and diacetins forms a solvent which can be employed to especial advantage in flavoring extracts and for many other purposes of a similar character where a permanent solution is desired.

According to the present invention glycerin and acetic acid are initially mixed together, a catalyst such as sulphuric acid is added to facilitate the reaction, and the mixture is subjected to heat, after which the resulting product is distilled in a manner to first drive off acetic acid and next a mixture of certain of the esters of glycerin and acetic acid.

This method permits the recovery of a large percentage of acetic acid which may either be used directly for other purposes or refined and employed again in cyclic repetition of the process. The method furthermore results in a marked decrease in the length of time necessary to produce the solvent base as compared with any existing method now known.

It is desirable in the practice of this method to neutralize the free acid at the completion of the reaction and for this purpose a salt having an alkaline reaction, such as one of the alkali or alkaline earth acetates, has been found satisfactory. Of these acetates sodium acetate seems best adapted for the present purpose although potassium or calcium acetate may be use if so desired.

The following will serve as one specific example of the new method.

A mixture of 18 pounds of glycerine, 108 pounds of glacial acetic acid (99%) and 0.18 pounds of sulphuric acid 66° Bé. are heated for about 1½ hours at a temperature of 100° to 110° C. Approximately 1 pound of crystallized sodium acetate is then added to neutralize the sulphuric acid which is present. This mixture is allowed to stand for a sufficient length of time to cause the separation of the precipitate, which will generally not exceed one hour. The mixture is then filtered to remove any sodium sulphate or sodium bisulphate which may be formed as a precipitate. It has been found that the separation is facilitated if the mixture is subjected to agitation at intervals during this period. The next step is to distill the filtrate at atmospheric pressure and collect the resulting distillate up to a temperature of 140° C. approximately. The distillate collected up to this point is practically pure acetic acid of about 87% strength, which has a ready market. After the collection of the acetic acid has been completed the pressure upon the still is reduced and the resulting distillate which then comes over is a mixture of mono- and diacetins in which the diacetin predominates. This mixture is a substantially colorless liquid admirably adapted to form a solvent base for the various forms of oil employed in flavoring extracts. If this mixture is found to possess a slightly bitter flavor it may be purified by the use of bone black.

What is claimed is:

1. A method of producing a mixture of mono- and diacetins which consists in mixing glycerin and acetic acid, adding sulphuric acid, heating the mixture to a temperature of approximately 100–110° C., and finally subjecting the resultant product to distillation to recover certain of the esters of glycerin and acetic acid which are formed.

2. A method of producing a mixture of mono- and diacetins which consists in mixing glycerin and acetic acid, adding sulphuric acid, heating the mixture to a temperature of approximately 100–110° C., subjecting the mixture to distillation at atmospheric pressure to recover acetic acid and subsequently distilling the remainder of the mixture at a reduced pressure to drive off a mixture of mono- and diacetins.

3. The method of producing a mixture of mono- and diacetins which consists in mixing glycerin and glacial acetic acid, adding sulphuric acid to facilitate the reaction, heating the mixture to a temperature of approximtely 100–110° C., adding sodium acetate to neutralize the sulphuric acid at the completion of the reaction, filtering the resultant product, and distilling the filtrate at different pressures to first drive off the acetic acid and next drive off at a lower pressure a mixture of mono- and diacetins.

GUSTAVUS J. ESSELEN, Jr.